May 26, 1970  J. B. FULP  3,513,791
LABEL SEWING APPARATUS
Filed April 27, 1967  4 Sheets-Sheet 1

INVENTOR.
JAMES B. FULP

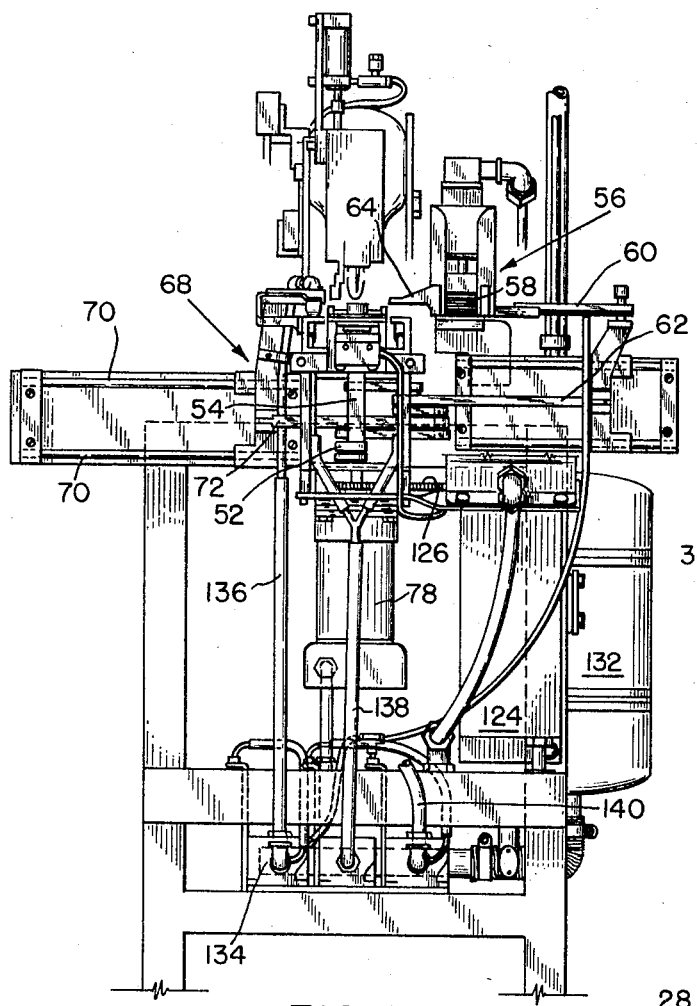
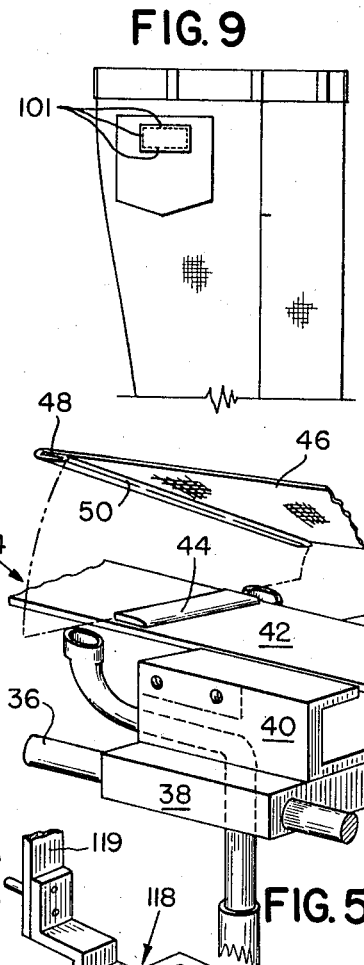
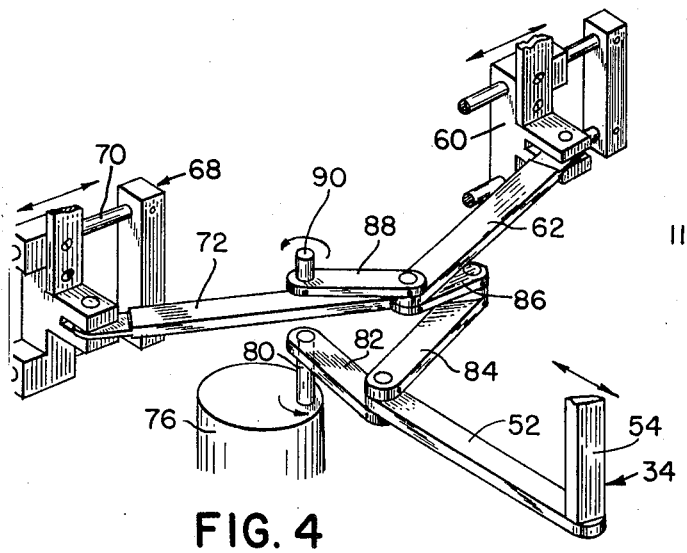
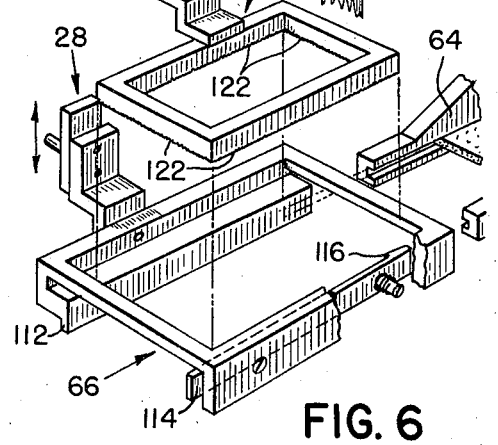
INVENTOR.
JAMES B. FULP

May 26, 1970    J. B. FULP    3,513,791
LABEL SEWING APPARATUS
Filed April 27, 1967    4 Sheets-Sheet 3
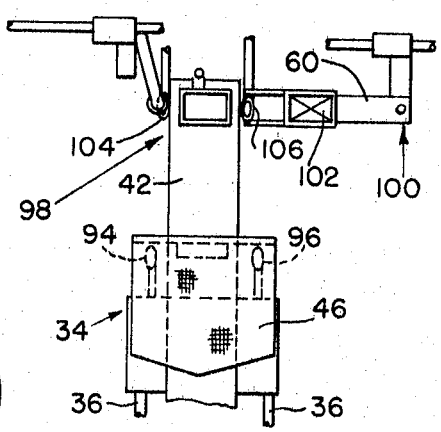
FIG. 8a
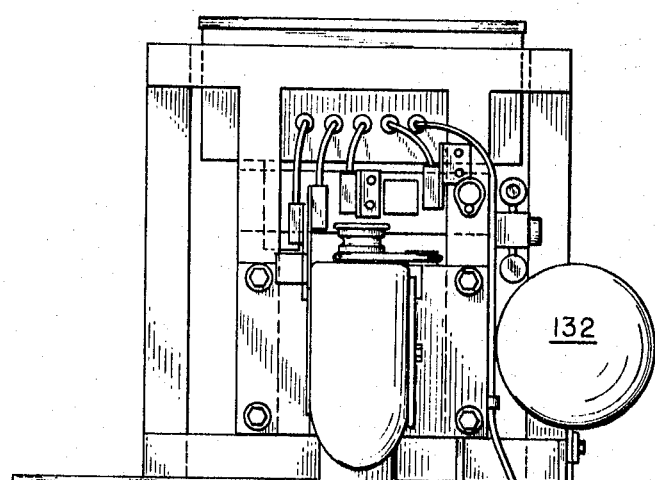
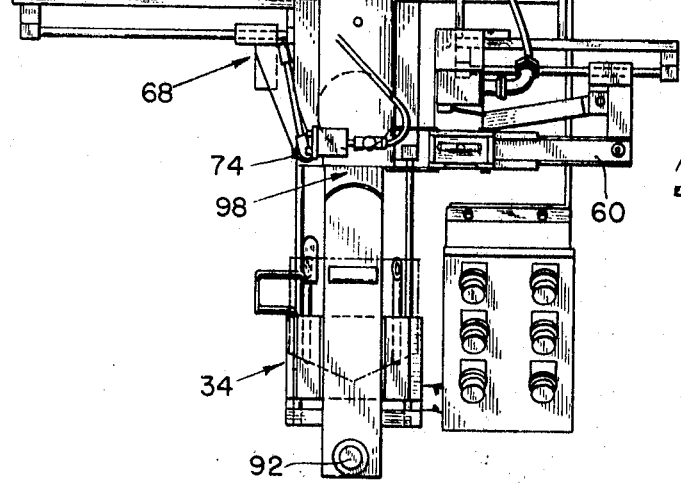
FIG. 3
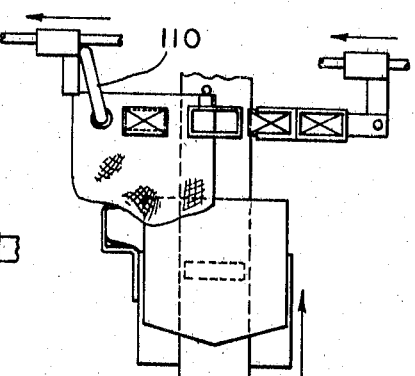
FIG. 8b
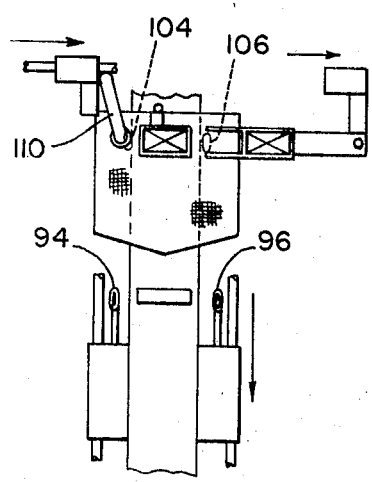
FIG. 8c
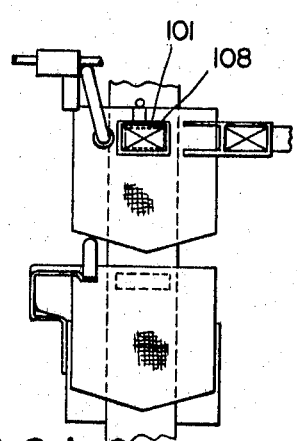
FIG. 8d
FIG. 8e    INVENTOR.
JAMES B. FULP

INVENTOR.
JAMES B. FULP

United States Patent Office 3,513,791
Patented May 26, 1970

3,513,791
LABEL SEWING APPARATUS
James B. Fulp, Summerfield, N.C., assignor to Blue Bell, Inc., Greensboro, N.C., a corporation of Delaware
Filed Apr. 27, 1967, Ser. No. 634,356
Int. Cl. D05b 3/12
U.S. Cl. 112—104
8 Claims

ABSTRACT OF THE DISCLOSURE

This invention relates to material handling devices and their application and particularly relates to an apparatus for securing labels and the like to other material segments which embodies in its preferred form a linkage assembly moving in one cycle intervals to select labels and fabric segments simultaneously from separate and independent sources, position those selections at a common sewing site, seam the two together and remove the sewn members to a remote location for further handling.

BACKGROUND, BRIEF SUMMARY AND OBJECTIVES OF THE INVENTION

A great number of improvements in sewing or bonding machine attachments have been made during the past several years which enable machines to sew or secure along irregular patterns or follow programed seams, and these improvements when applied to sewing machines are usually the result of making structural modifications on the presser foot or stitch plate so that the material to be sewed can be moved selectively relative to the needle. Such modifications have been of tremendous assistance to garment and article manufacturers in that an operation which was once done solely by manual manipulations can now be done uniformly and systematically by automatic means.

Sewing machine improvements of the nature of those described above have not, however, made easier the job of a machine operator who must position two or more segments of fabric in an exact relationship and then apply those combined members to the sewing or securing instrumentalities of a sewing or bonding machine for stitching or attaching. This operation still requires that the operator select the individual segments by hand, place them together, orient the segments properly with respect to each other and then situate the oriented segments proximate the securing means of the machine.

One particular operation which illustrates the monotony of this laborious technique is that of applying labels or patches to fabric segments forming, in an individual state, garment components suhh as pockets, sleeves, legs and the like prior to the construction of a finished garment using these components.

A number of manufacturers of sport and work clothes conveniently apply a significant label bearing important trademarks to a rear patch pocket for styled trousers and slacks, and this operation is illustrative of those previously referenced. While the present invention was developed particularly to apply a label to a patch pocket for this style of clothing, it is obvious that the technique and apparatus involved could be applied to the manufacture of many other articles of clothing where the affixation of labels, initials, segments or other materials to fabric segments forming parts of a final garment.

Essentially, the invention involves a movable linkage mechanism supported by a chassis and rotatably driven selectively by an associated motor. The mechanism will select, position, secure together and remove, for example, a label and pocket fabric segment, which articles will be used illustratively throughout, during one complete cycle of operation. A segment receiving and positioning unit accepts an aligned pocket segment and moves the patch in registry to a sewing site located conveniently beneath the machine needle, the sewing machine being used here for illustrative purposes only as a convenient and conventional securing means. After the positioning of the fabric segment is initiated, a label conveyor removes a label from a reservoir or hopper and positions that label at the sewing site directly above the pocket segment at which time the presser feet of an associated sewing machine are displaced to locate the label firmly against the pocket. The sewing machine is then automatically activated and sews along the four sides of the label as the presser feet turn approximately 90 degrees on four occasions during the seaming of the label, the result being that the label is firmly sewn against the pocket patch by the end of the sewing operation. As soon as the sewing step is completed, an ejector device moves the joined label and pocket path from the sewing site to a remote location for subsequent handling. The movement of the label and the fabric segment individually and combined is neatly accomplished by a plurality of suction devices and mechanical components which cause the label and fabric segments to adhere closely and move in response to the carrying devices as they are moved to and from the various operational locations.

A number of sensors, limit switches and trip cams are user to refine the operation of the rotating linkage which, with assisting components, comprises the segment and label positioning and securing assembly, and these articles and their cooperation with other machine components will be particularly described during the detailed description to follow.

From the brief summation above, it will be obvious that a primary object of the present invention is to provide an apparatus for positioning one material segment proximate a second segment which will eliminate the manual handling and alignment of the segment and label prior to the securing operation normally required.

It is another object of the present invention to provide a material handling apparatus for securing a fabric segment such as a label to a second fabric segment which can combine the members in a time heretofore unachievable by manual techniques.

Yet another object of the present invention is to provide a handling apparatus utilizing a unique segment and label positioning and securing assembly comprised of a rotating linkage operable to introduce a segment, position a label at a selected location thereon, attach the label to the segment and remove the attached components to a remote location during one complete cycle of operation.

Still another object of the present invention is to provide a novel suction means and mechanical components for conveying labels, segments and the two combined to various locations throughout the machine for operative steps required at each.

A further object of the present invention is to provide an apparatus for attaching labels to fabric segments which includes a unique feeding assembly for the supplied labels operable from the bottom of a positioned label stack and a novel label holding attachment secured to the presser feet of the sewing machine so that each handled label can be placed at a specific location on a fabric segment prior to the sewing operation.

Yet still another object of the present invention is to provide an apparatus of the kind described which utilizes a cam-actuated control center, the center including a plurality of cams mounted on a common shaft to accomplish switching at the necessary and proper times according to information programmed via each individual cam surface.

Yet a further object of the present invention is to provide an appaartus of the type described which can be interrupted at various times throughout its operation cycle without machine damage or wear in the event that a malfunction occurs in any of the operating components and in the event that tests are necessary on any of the switches or related equipment.

Another object of the present invention is to provide an apparatus of the type described which can be adapted to sew or secure any desired label or segment onto a separate fabric segment regardless of the nature of the goods involved.

These and other objects of the present invention will become apparent from a consideration of the accompanying drawings constituting a part hereof in which characters of reference refer to the described parts.

BRIEF FIGURE DESCRIPTION

FIG. 2 is a front elevational view of the apparatus showing the label feeding slide and hopper arrangement, the solenoid controlled suction attachments and the chassis-carried vacuum tank.

FIG. 3 is a top plan view of the apparatus shown in FIGS. 1 and 2 illustrating the positioning of a control box, the segment receiving and positioning device and the label conveyor and their relationship to the sewing site beneath the needle of a carried sewing machine.

FIG. 4 is a perspective, enlarged and fragmentary view of the linkage assembly comprising a portion of the segment and label positioning and securing assembly which rotates (see arrow) to operably select segments and labels from independent sources, combines the two at a sewing site, sews the two together and subsequently removes the sewn components to a remote location.

FIG. 5 is a perspective, sectional and fragmentary view of the segment receiving and positioning device showing the guide member utilized to position the fabric segment in registry and alignment and the suction mechanism which causes the segment to adhere positively to the device while it is being moved into position at the sewing site.

FIG. 6 is a perspective enlarged, exploded and fragmentary view of the label holding attachment which is secured to one presser foot and which receives sequentially segments therein from an associated hopper for subsequent positioning against the fabric segment preparatory to sewing.

FIGS. 8(a) through (e) is a sequential portrayal of the segment and label positioning and securing assembly performing the steps involved in one operational cycle of the sewing mechanism including selecting labels and segments from independent locations, combining the components for a sewing operation and removing the sewn elements to a remote location.

FIG. 9 is a finished garment and particularly a pair of work dungarees bearing a pocket having a label secured thereon by operation of the apparatus and by compliance with the teachings set forth herein.

Figure 10:

FIG. 10 is a side elevational, sectional and fragmentary view of the novel connecting and raising mechanism of the label holding attachment and frame carried by the machine presser feet.

Figure 11:
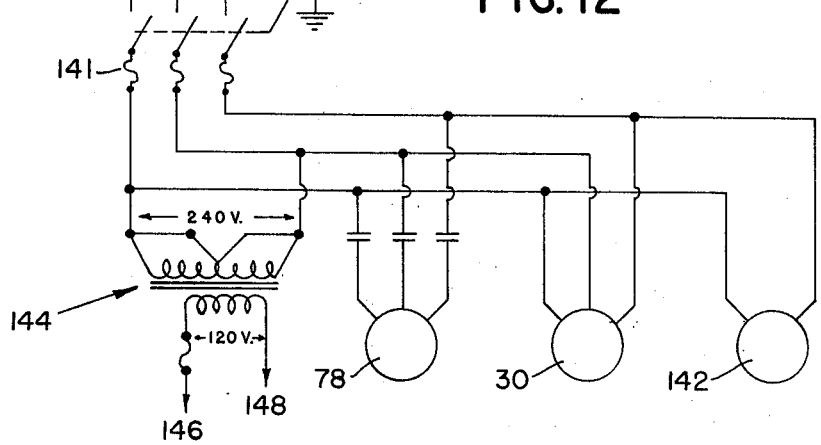

FIG. 11 is an electrical schematic diagram of the main three (3) phase power supply circuit.

Figure 12:
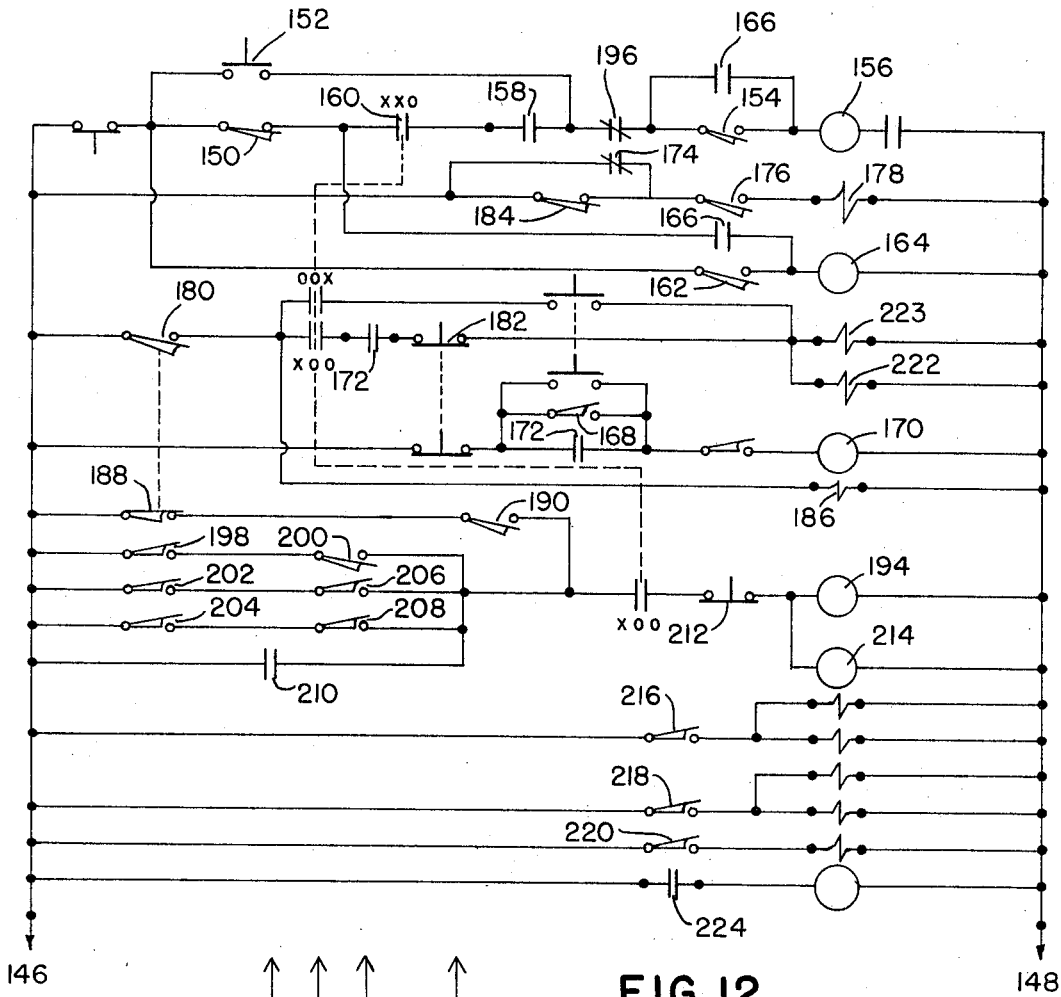

FIG. 12 is an electrical schematic diagram of the machine test and operational circuit.

DETAILED DESCRIPTION OF THE INVENTION

Figure 1:
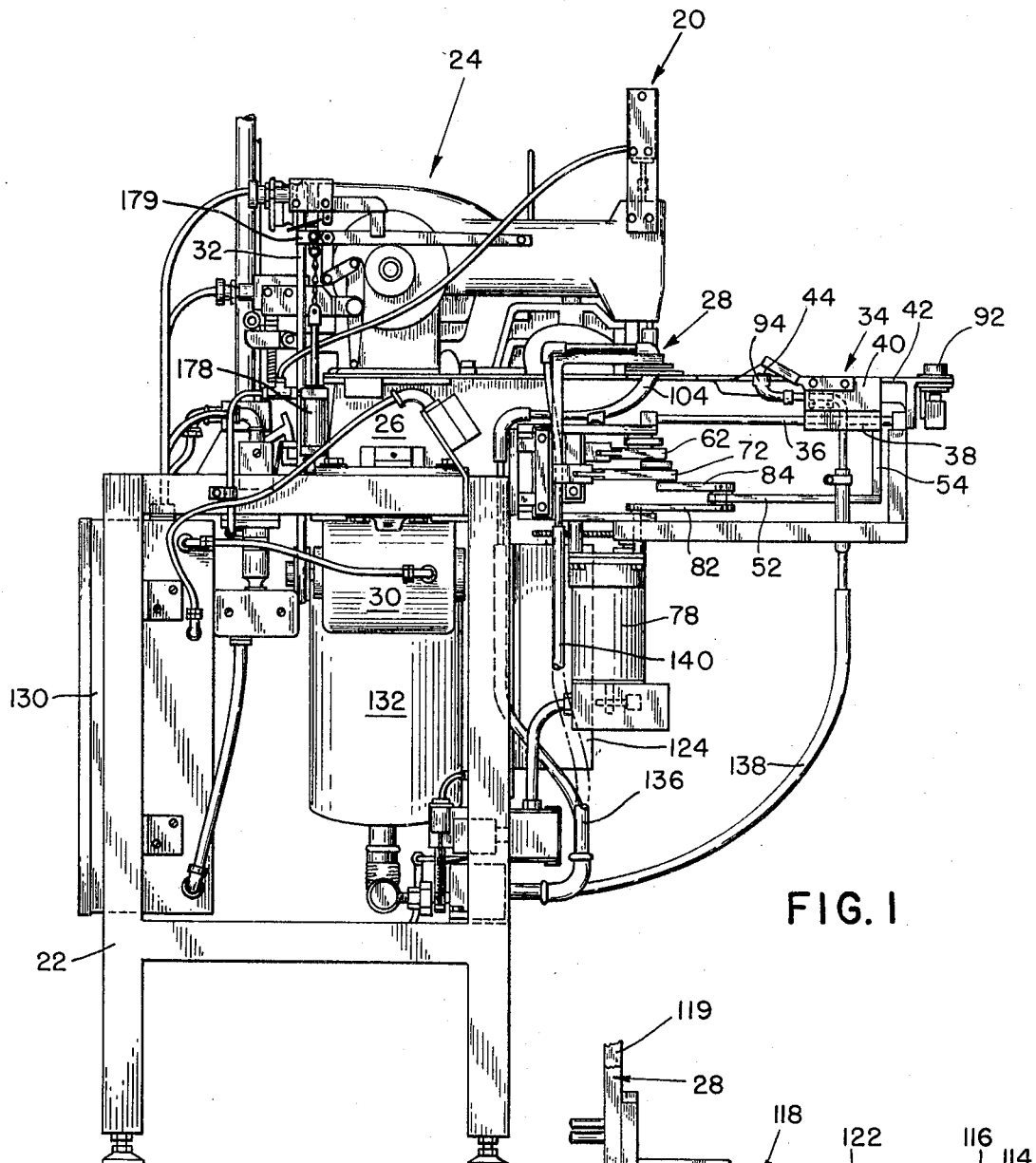
FIG. 1 is a side elevational view of the apparatus constituting the present invention showing the chassis and a carried sewing machine along with the orientation of the segment and label positioning and securing assembly driven by a vertically positioned motor.

Referring now to the drawings and particularly to FIG. 1, there is shown an apparatus generally designated 20 comprising a frame-like chassis 22 carrying a sewing machine generally designated 24 mounted on an elevated pedestal 26 positioned atop the chassis. The sewing machine is of conventional manufacture and contains a first oscillatory presser foot generally designated 28 which will make desired turns and corners about a square border when so programmed. The sewing machine 24 is driven by a conventional electric motor 30 of convenient size which is coupled to the machine 24 by way of a belt 32, the machine motor and sewing machine operating selectively when the sewing operation is required.

The fabric segment receiving and positioning device is generally designated 34 and particularly illustrated in FIG. 5 which shows one of a pair of rods 36 that allows slidable movement of an encapsulating member 38 carrying supporting structure 40 and a fabric-receiving plate 42. A guide member 44 is positioned on plate 42 and provides a feeler for the operator handling a fabric segment whether or not the segment positioned has been placed in alignment and registry on the plate. The segment 46 has been prefolded along one edge 48 so that the tuck 50 of that edge abuts against member 44 to assure alignment. A displacing arm 52 attaches to member 38 by means of a vertical post 54 and controls the reciprocating movement of device 34 in a manner which will be subsequently described.

A label hopper generally designated 56 carries a shiftably aligned stack of labels 58 which are systematically and sequentially removed by means of a displacing slide 60 which is reciprocated by means of a second operating arm 62 in a manner subsequently to be described. The transfer of a label from hopper 56 is made from the exit end 64 of the hopper into a label-holding attachment generally designated 66 and elevated to a receiving position because of its integral connection to presser foot 28, and the label is maintained lightly in that attachment in a manner to be explained.

A segment and label removal mechanism generally designated 68 rests upon directional slide bars 70 and reciprocates according to movement by a third connecting arm 72 in a manner subsequently to be described. The particular element securing the combined fabric segment and label to the removal mechanism 68 is a unique suction device 74 which will be further explained when other suction devices controlling the movement of segments and labels are detailed.

The coordinated motion of the segment-receiving and positioning device, the label conveyor and the removal mechanism is governed by the rotation (see arrow) of a shaft 76 which is driven at a reduced speed of approximately 35 revolutions per minute by a feeder motor 78 which is activated when an operational cycle is initiated. Shaft 76 is extended by a reduced portion 80 which carries a perpendicular linkage 82 rigidly secured to the extension.

For purposes of illustration, all linkages fixed about a pivot point and thus moving when that point rotates will be designated by a dot on the edge of the member adjacent the pin. When the linkage is free to rotate about the pin and there is relative movement between the linkage and pivot point, no dot will be shown.

Additional linkages 84 and 86 are combined in a manner to join arms 52, 62 and 72 for synchronized movement to operate the devices previously described. A final linkage 88 with a pin fixed shaft 90 having an axis identical with the axis of shaft extension 80 provides a stabilizing member for the entire oscillating assembly since shaft 90 is seated in a bearing (not shown) for rotational movement only as the various linkages and connecting arms move along their prescribed paths.

An operational cycle is best illustrated in the sequential operation shown in FIGS. 8(a) through 8(e), and these will be described so that the components discussed previously can be incorporated in proper perspective.

FIG. 8(a) depicts the four basic stations involved in the operation of the present sewing apparatus, and when the start button is depressed, the feeder motor 78 is engaged and shaft 76 rotates.

A fabric segment 46, in this case a patch pocket, is placed on the segment-receiving and positioning device 34 in a manner previously described and is retained in alignment by means of dual suction nozzles 94 and 96. Plate 42 provides a ramp along which pocket is moved, and member 40 guided by connecting rods 36 is free to extend inwardly or outwardly according to the movement of connecting arm 52 (FIG. 4).

The linkage making up the segment and label positioning and securing assembly is so constructed that as the pocket 46 is moved into a sewing position at the sewing site 98, a label conveyor, shown generally as 100, simultaneously feeds a label 102 from stack 58 of hopper 56 into the label holding attachment 66 secured to the presser foot 28 of the machine. The positioning of label 102 in the label-holding attachment 66 places the label in the exact location for sewing except that it is elevated some distance above the surface of pocket 46 as the presser foot is at this time in the raised position.

Once pocket 46 is positioned at the sewing site 98, the suction nozzles 94 and 96 cease to operate and suction commences at nozzles 104 and 106 to retain the pocket in the sewing position.

After shaft 76 rotates approximately 180 degrees and starts the second or return part of the operating cycle, the receiving and positioning device 34 and the label conveyor 100 return to their starting position. While conveyor 100 is moving to its initial location, pressure foot 28 and the carried label holding attachment 66 are lowered so that label 102 is securely pressed against pocket 46 in preparation for the sewing operation.

Sewing is done about the edges 101 of the rectangularly shaped label 102 (see FIG. 9), and the operation is accomplished through use of a conventional attachment (not shown) operable with sewing machine 24. The pocket and label arrangement is turned by the attachment through four 90 degree angles so that a seam may be sewn along each edge of the rectangularly shaped label securing that label to pocket 46.

FIG. 8(b) shows the pocket 46 placed at the sewing site 98 and the label conveyor extended indicating that a label has just been placed into the label-holding attachment 66. Note that because of the particular arrangement of the linkage shown in FIG. 4, the removal device 68 has also been displaced in a direction similar to that of the conveyor 100.

In FIG. 8(c), the linkage has completed approximately 180 degrees rotation and is now returning the components to their original position. The conveyor 100 and removal device 68 are moving to the right, and the segment-receiving and positioning device 34 is returning to receive a second pocket segment so that a second cycle may be commenced.

FIG. 8(d) illustrates the loaded second pocket segment and the positioned label and pocket at the sewing site where the sewing operation has just been completed and a peripheral seam 108 has been introduced by the sewing machine.

FIG. 8(e) shows the commencement of a new cycle and the conclusion of the previous cycle as device 34 begins its travel to the sewing site so that a second fabric segment may be disposed thereat while the removal device 68 by way of suction member 110 has positively removed the sewn label and segment components to a remote location. When suction device 110 is activated, the suction mechanisms 104 and 106 are cut off so that the sewn segments and labels can be removed from the sewing site.

Figure 7:
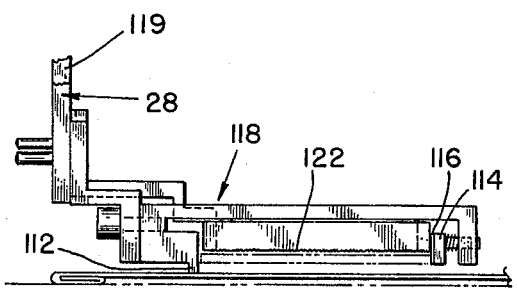
FIG. 7 is an end elevational, sectional and fragmentary view of the label holding attachment which is connected to one presser foot of the sewing machine and of the label holding frame mounted therein and carried by a second foot which cooperates to secure a label against the fabric segment for subsequent sewing when the presser feet of the machine are lowered.

The label-holding attachment 66 is constructed to receive snugly a label from the exit end 64 of hopper 56 between a stationary label-receiving foot 112 and a spring-biased bar 114 so that a label inserted into the attachment (see FIG. 7) will be retained until the presser foot is lowered and the sewing operation commences. A slightly extruded portion 116 of bar 114 precludes the label from coming out of the attachment when feed slide 60 returns to its original position.

An interior label-securing frame generally designated 118 is held within the confines of attachment 66 though it is directly connected to a separate presser foot 119 which moves independently of foot 28 when activated. Frame 118 has saw-toothed lower extending edges 122 which securely grip the periphery of a label once presser foot 119 is lowered and exerts pressure against the frame. Since bar 114 does not extend downwardly as far as does foot 112, frame 118 pushes the label out of attachment 66 thus obviating any retention of the label when the sewing operation is completed and the presser feet are raised.

The presser feet 28 and 119 are raised (and lowered) by an actuating bar 120, attached to solenoid 178 through linkage 179, which is shaped to lift foot 119 slightly before foot 28 thus ensuring that the joined label and fabric segment will not be inadvertently lifted by elevation of the presser feet.

An electrical control box 124 houses the plurality of control cams which rotate about a common shaft and are driven by a chain 126 connected to feed motor 78. The numerous cams housed within box 124 are physically programmed to trip selected switches and initiate particular operations of the machine, and these devices will be more particularly explained and described during the subsequent discussion concerning the electrical circuitry.

A main power box 130 houses the line switch and fuses for the various motors, and this circuitry will also be explained in detail subsequently.

A tank 132 provides a vacuum for the various suction components used to convey fabric segments and labels during the operational cycle of the sewing apparatus. A number of individual suction systems extend from manifold 134 to the various operational components of the machine, some of which have been previously described. Vacuum line 136 serves suction nozzle 110 at the removal device, line 138 serves suction nozzles 94 and 96 on the segment-receiving and positioning device, and line 140 serves nozzles 104 and 106 located in the sewing machine plate to maintain the fabric segment in position and alignment at the sewing site.

A number of vacuum actuated sensor devices are associated with the suction systems and will be subsequently detailed in conjunction with the explanation of the electrical circuitry and components, these sensors serving to de-activate the sewing apparatus at any operational step when a vacuum change indicates either a label, segment or the two combined is not positioned at a desired location.

FIG. 11 is an electrical schematic diagram of the main power circuit controlling the operation of the sewing machine disclosed herein, the service being three phase from a suitable three phase source (not shown) and fused 141 appropriately for adequate protection. Feeder motor 78 and the sewing machine motor 30 are conventional three phase motors served directly from the three phase supply, while the vacuum motor 142, which is housed within the vacuum tank 132, is a 240-volt single phase motor connected across two phases of the incoming lines.

Voltage for the control circuits is obtained through a step-down transformer generally designated 144 which is also connected across two phases of the incoming three phase supply line. Terminals 146 and 148 extending from the secondary side of the transformer provide voltage for the control circuit shown in FIG. 12.

The entire control circuit is shown schematically in FIG. 12, and this circuit will now be described with respect to individual components after which the components and their operation will be summarized to reflect the functioning of the entire electrical control system. Switch 150 is cam operated so that it is open only when segment-receiving and positioning device 34 is in the "home" position. Thus when the cam has been displaced to start its rotational cycle, the switch is closed (as when the starter 152 is energized) and stays closed until an operational cycle is completed.

A limit switch 154 is closed when the presser feet are in the raised position because of their precise location. Likewise when the presser foot is lowered, limit switch 154 opens. Thus upon actuation of the start switch 152 when the presser feet are raised and limit switch 154 is closed, cam-operated switch 150 closes and remains so for one complete cycle, relay 156 is actuated and closes contacts 158 and a feeder motor circuit is then maintained through AUTO-CYCLE-JOG switch 160 (normally closed in the AUTO position).

Cam-operated switch 162, when programmed to close, energizes relay 164 thus closing contacts 166, one of which continues to energize relay 164 after cam-operated switch 162 re-opens and the other forming a shunt circuit about limit switch 154 to maintain the feeder motor circuit even after the presser feet are lowered and limit switch 154 opens.

A cam closes switch 168 and relay 170 is energized thus closing contacts 172 and opening contacts 174. When the segment-receiving and positioning device returns to its initial position, limit switch 176 is closed and the presser foot lift solenoid 178 is actuated to lower the presser feet with a label carried by the label-holding attachment onto a pre-positioned pocket segment. At this time, the label has been placed on the pocket and the label-feeding attachment is returning to its beginning position though it has not yet reached that initial position. This operation is essentially one of time saving in that the presser foot is lowered and the sewing operation commenced before the label feeder has actually completed its cycle.

When presser feet 28 and 119 go down, limit switch 180 closes so that the sewing machine trip solenoid circuit is made through AUTO-CYCLE-JOG (the switch is closed in the AUTO position), contact 172 and the "No-Sew" switch 182 (normally closed), and the sewing machine then goes through its four directional sewing cycle to provide a seam along each edge of the rectangularly shaped label 102.

When the feeder cycle is complete, switch 150 opens (at the "home" position) and relay 164 is de-energized thus stopping the feeder motor. Cam-operated switch 184 opens thus causing the presser feet to be raised when presser foot solenoid 178 is de-energized.

When limit switch 180 is closed because the presser feet have been lowered, the sewing machine plate vacuum solenoid 186 is actuated to remove suction from line 140 leading to the machine plate which has acted to hold the positioned fabric segment until the presser feet have been lowered and the label has been snugly positioned thereagainst. There is no need to have applied suction when the presser feet are lowered.

When the presser feet descend, limit switch 188 is contacted and opened. When switch 188 is in the closed position (the presser feet are raised) a limit switch 190 engages the thread feeding to the needle so that any interruption sensed at this time will cause switch 190 to close and relay 194 to be energized. Energization of relay 194 will open normally closed switch 196 and thus interrupt the feeder motor circuit and cause a machine shut-down. So long as relay 194 remains in the unenergized state, switch 196 is closed and provides an integral circuit component for maintaining a feeder motor starter circuit during the machine operational cycle.

A number of other sensors are keyed from the operation of relay 194 including limit switch 198 which closes when the label hopper is empty. The complete sensor circuit is also controlled by cam-operated switch 200 which is programmed to operate at pre-selected intervals to detect whether or not the hopper is empty or has failed to feed a label. An empty hopper (switch 198 closed) during an operation of cam-operated switch 200 would energize relay 194 and open contacts 196 to interrupt the feeder motor circuit. Similarly, limit switches 202 and 204 control the operation of the machine in the event a fabric segment is not positioned correctly at the sewing site (machine plate) and removal device. Cam-operated switches 206 and 208 are systematically actuated to detect whether or not a fault exists (switches 202 and 204 are closed). Contacts 210 merely provides a holding circuit when relay 194 is energized so that the contact closes and retains relay 194 in the energized state until the reset switch 212 is manually actuated to start the operation of the machine from the beginning. A sensor indicator light 214 is energized once relay 194 has been activated, and this light remains in the lit condition until the relay is reset by reset button 212.

Programmed cams control the energization and de-energization of the various vacuum means, these vacuum devices being actuated to coincide with the positioning of the linkage disclosed in FIG. 4. For example, cam-operated switch 216 closes when the segment-receiving and positioning device returns to the "home" position, and the closing of this switch energizes suction means 94 and 96 along with suction means 110. The closing of switch 218 by a cam will energize suction means 104 and 106 and de-energize suction means 94 and 96. Finally, switch 220, when cam-operated, will de-energize suction means 110 for an appropriate period of time. The solenoids used in the suction control systems are of a double action type in that they may be tripped by one set of switches to operate and energize one vacuum means operated by a second set of switches to de-activate a second suction means.

A counter coil 222 is wired in parallel with the sewing machine trip solenoid 223 so that a unit is registered each time the sewing machine performs its sewing cycle of attaching one label to one fabric segment. The counter coil operates a counter 224 to record the number of operations visually for reference.

The inclusion of an AUTO-CYCLE-JOG switch 160 provides maximum flexibility in testing the operational characteristics of the machine in that the machine may be made fully automatic, be made to operate for only one cycle or be made to move momentarily so that certain components may be tested and, if necessary, replaced.

Thus in the broadest sense, the present invention centers about a segment positioning assembly, the substance of which involves a positioning and securing linkage that is best illustrated in FIG. 4. The linkage includes a first segment receiving and positioning device adapted to receive and situate a first segment in registry at a preselected location which is actually, in the preferred embodiment, the machine plate directly beneath the needle of a conventional sewing machine mounted adjacent thereto, a second segment positioning device functionally operable with the first receiving and positioning device which moves a second segment from an adjacent hopper to the preselected location in a fixed relationship with respect to the first segment. The invention further includes a securing device which will bond the first and second segment together at the preselected location, and a removal device which functions to transport the sewn-together segments to still another location. As the sewn segments are removed from the sewing site, a new segment is simultaneously positioned by the first receiving and positioning device at the securing instrumentalities and a second cycle is commenced. A number of suction devices are coordinated with the operation of the segment positioning and securing devices so that the transferred segments, either individually or together, are maintained in alignment and registry until they are deposited at the preselected locations.

The second segment positioning device includes in the example shown a hopper for maintaining a plurality of stacked segments and an associated feed slide cooperating with the hopper to remove segments sequentially therefrom and convey the individually removed segments to the sewing site by first positioning the segment, a label as illustrated, in the label-holding attachment secured to one presser foot of the sewing machine.

The securing device in the preferred form is a sewing machine which contains a conventional needle assembly has associated presser feet maitaining a label-holding attachment which will make selected turns in order to allow the machine to seam along the four sides of the rectangularly shaped label so that positive adherence between the label and the fabric segment is achieved. The turning mechanism for moving the combined label and fabric segment is of a conventional nature but operates smoothly with the remaining components of the present invention to provide an expeditious sewing operations.

It is apparent that the capabilities and operation of the presently described apparatus can be increased and the operation made fully automatic without any departure from the disclosure set forth therein. For example, an automatic positioning means could be incorporated in the present combination to eliminate the operator and the step of positioning a new fabric segment onto plate 42 along guide member 44.

It is also apparent that the operation of the machine can be utilized in any application where the securing of one independent item to a second independent item is required. Additionally, it is well within the scope and purpose of the present disclosure to consider that stitching, embroidering, crocheting or other artistic sewing techniques may be applied at the sewing site by a modified sewing machine onto a fabric segment of any general configuration. For example, initials could be entered onto shirt pockets and the like.

Unquestionably, many modifications and variations may be made in the construction of the chassis, the segment and label positioning and securing linkage, the various suction means and the operational cycle as well as other phases of the present inventive concept in light of the above teachings without departing from the real spirit and purpose of the invention. Such modifications of parts as well as the use of equivalents to those herein illustrated and described are reasonably included and contemplated.

What I claim is:

1. A material handling apparatus for positioning a first material segment with respect to a second segment at a securing site comprising: a chassis; a segment positioning assembly carried by said chassis, said assembly including first segment receiving and positioning means for receiving and conveying a first segment to a preselected location, and second segment positioning means, independent of said first segment receiving and positioning means, cooperable with said first segment means to position the second segment at the preselected location in a fixed relationship with respect to said first segment, said assembly further including securing means operable with said first and second segment positioning means to secure the first segment to the second segment at the preselected location.

2. A material handling apparatus as claimed in claim 1, said assembly further including removal means operable with said first and second segment positioning means and said securing means to remove the secured first and second segments to still another selected location.

3. A material handling apparatus as claimed in claim 2 further comprising: drive means for operating said assembly for one cycle intervals; and cycle activating means for initiating said drive means at the commencement of each cycle after completion of the previous cycle by the removal of said first and second segments by said removal means.

4. A material handling apparatus as claimed in claim 3, said first segment receiving and positioning means including a guide for aligning a selected segment preparatory to the positioning of the segment at the securing site, and suction means retaining the selected segment in alignment with said guide until the segment is positioned at the securing site.

5. A material handling apparatus as claimed in claim 4, said second segment positioning means including a hopper for maintaining a plurality of segments in a stacked relationship, and a feed slide operable with said hopper and adapted to remove and convey segments sequentially from the hopper to the securing site.

6. A material handling apparatus as claimed in claim 5, said securing means including sewing instrumentalities having a holding attachment adapted to receive a second segment removed from said hopper by said feed slide and for turning the first and second segments in selected directions and sewing both segments along all segment edges.

7. A method for handling material comprising the steps of: moving a first material segment along a first predetermined path of travel; positioning the first segment at a selected location; moving a second material segment along a second predetermined path of travel; and positioning the second segment adjacent the first segment in a fixed relationship with respect to the first segment and securing the first segment to the second segment at the selected location.

8. A method for handling material as claimed in claim 7 further comprising the step of: removing the secured first and second segments to a remote location.

References Cited

UNITED STATES PATENTS

| | | | |
|---|---|---|---|
| 1,549,924 | 8/1925 | Rosenthal | 112—104 X |
| 2,313,433 | 3/1943 | Golden | 112—104 |
| 2,503,989 | 4/1950 | Armstrong et al. | 156—571 X |
| 3,272,160 | 9/1966 | Atkins et al. | 112—21 |

MERVIN STEIN, Primary Examiner

G. V. LARKIN, Assistant Examiner

U.S. Cl. X.R.

112—12, 1.15; 214—1